US008001946B2

(12) United States Patent
Leitl

(10) Patent No.: US 8,001,946 B2
(45) Date of Patent: Aug. 23, 2011

(54) PISTON FOR AN INTERNAL COMBUSTION ENGINE AND METHOD FOR ITS PRODUCTION

(75) Inventor: Markus Leitl, Remshalden (DE)

(73) Assignee: MAHLE International GmbH, Stuttgart (DE)

( * ) Notice: Subject to any disclaimer, the term of this patent is extended or adjusted under 35 U.S.C. 154(b) by 553 days.

(21) Appl. No.: 12/086,840

(22) PCT Filed: Dec. 15, 2006

(86) PCT No.: PCT/DE2006/002256
§ 371 (c)(1), (2), (4) Date: Jul. 7, 2008

(87) PCT Pub. No.: WO2007/076812
PCT Pub. Date: Jul. 12, 2007

(65) Prior Publication Data

US 2009/0025674 A1 Jan. 29, 2009

(30) Foreign Application Priority Data

Dec. 21, 2005 (DE) ........................ 10 2005 061 074

(51) Int. Cl.
*F02F 3/16* (2006.01)
*F01M 11/02* (2006.01)
*F16J 1/00* (2006.01)

(52) U.S. Cl. ................................ 123/193.6; 29/888.049

(58) Field of Classification Search ............. 29/888.049, 29/888.07, 888.072, 888.074; 123/193.6, 123/41.35; 92/166, 227, 228, 176, 186
See application file for complete search history.

(56) References Cited

U.S. PATENT DOCUMENTS 3,430,969 A * 3/1969 Clary ............................ 277/456
4,120,081 A * 10/1978 Rosch et al. ............. 29/888.045
4,907,545 A * 3/1990 Mills .......................... 123/41.35
5,737,838 A 4/1998 Niimi et al.
7,356,925 B2 * 4/2008 Bubeck .................... 29/888.074
2004/0026062 A1 * 2/2004 Ruhle ............................. 164/98
2006/0151573 A1 * 7/2006 Bubeck ......................... 228/101
2007/0107215 A1 * 5/2007 Scharp ..................... 29/888.042

FOREIGN PATENT DOCUMENTS

AT 003 210 11/1999
DE 18 01 450 8/1970
DE 196 49 363 6/1997
DE 197 01 085 7/1998
DE 298 23 552 1/2000
DE 199 40 440 3/2001
DE 101 14 404 10/2002
DE 102 18 999 11/2003

(Continued)

OTHER PUBLICATIONS

International Search Report.

*Primary Examiner* — M. McMahon
(74) *Attorney, Agent, or Firm* — Collard & Roe, P.C.

(57) ABSTRACT

A piston for an internal combustion engine has annular cooling passage arranged in the vicinity of the piston crown and radially on the outside, which, in those regions of the pin bosses which lie close to the boss holes, has boss cooling passages which are connected to the cooling passage and are intended for improved cooling of the pin bosses.

11 Claims, 2 Drawing Sheets

FOREIGN PATENT DOCUMENTS

Figure 1:
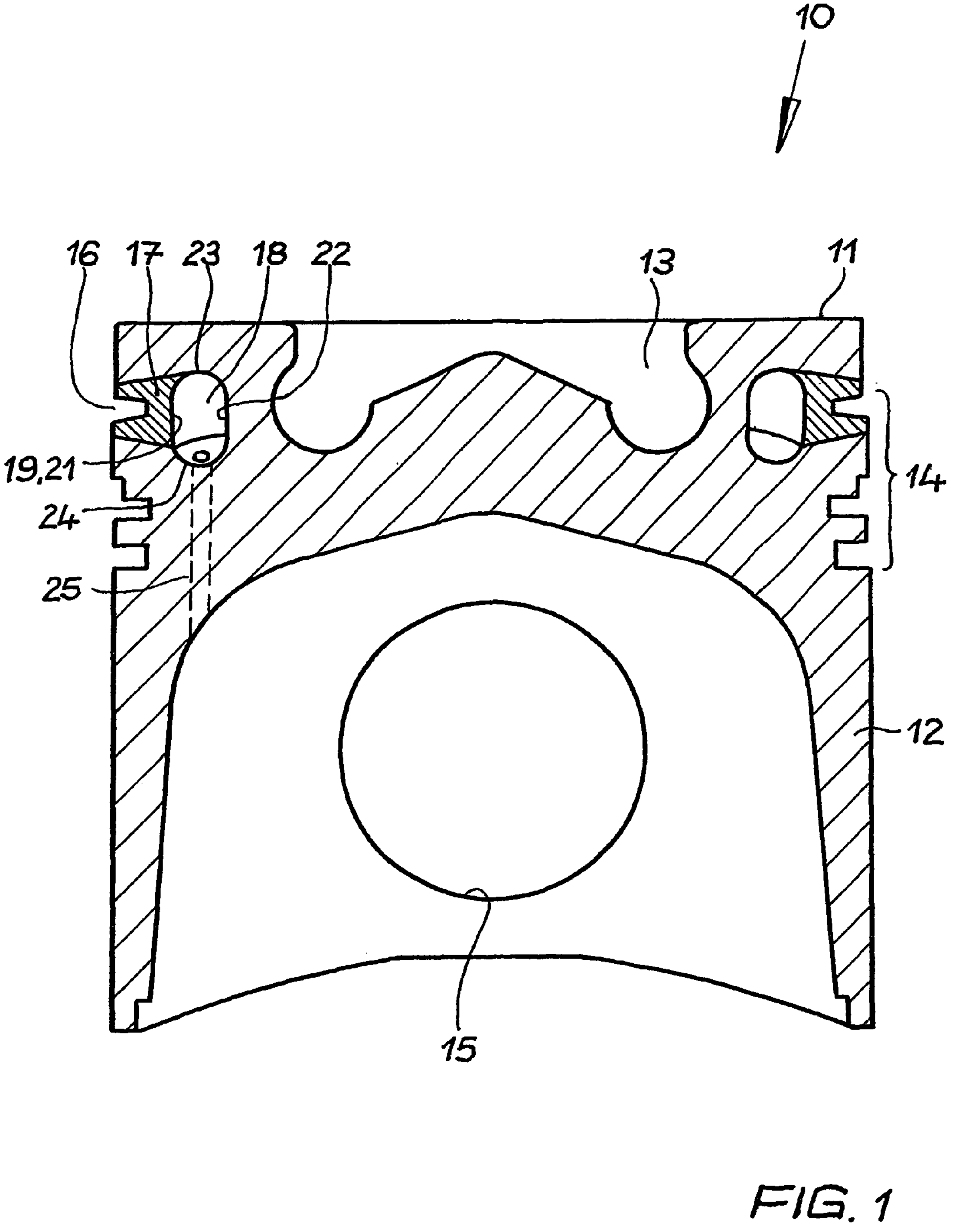

| | | |
|---|---|---|
| DE | 103 25 916 | 2/2004 |
| EP | 0 774 542 | 5/1997 |
| EP | 0 775 542 | 5/1997 |
| GB | 1 229 346 | 4/1971 |
| GB | 2 335 253 | 9/1999 |
| JP | 01-224158 | 9/1989 |
| JP | 05-256192 | 10/1993 |
| WO | WO 04/000489 | 12/2003 |

* cited by examiner

FIG. 2
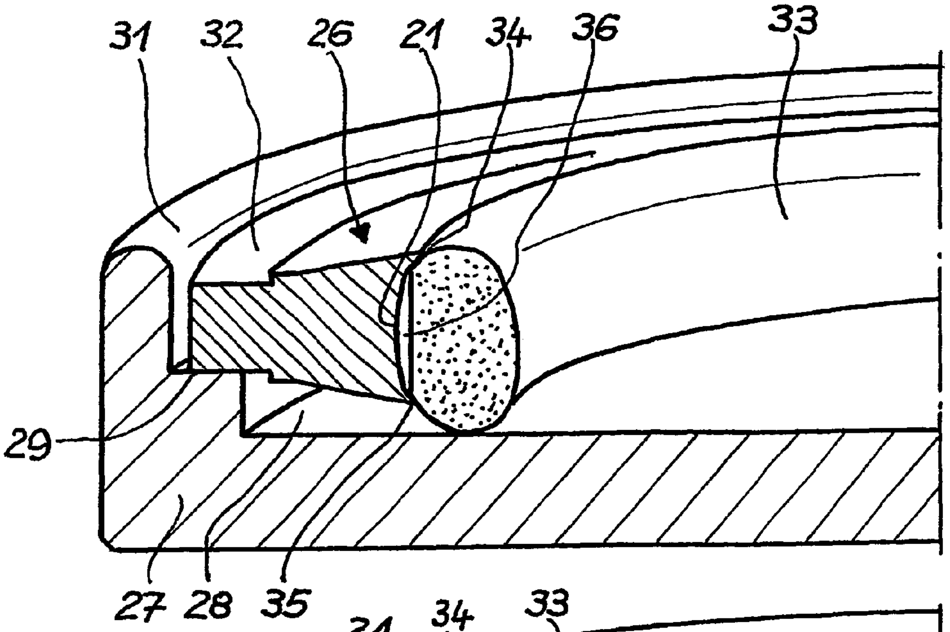
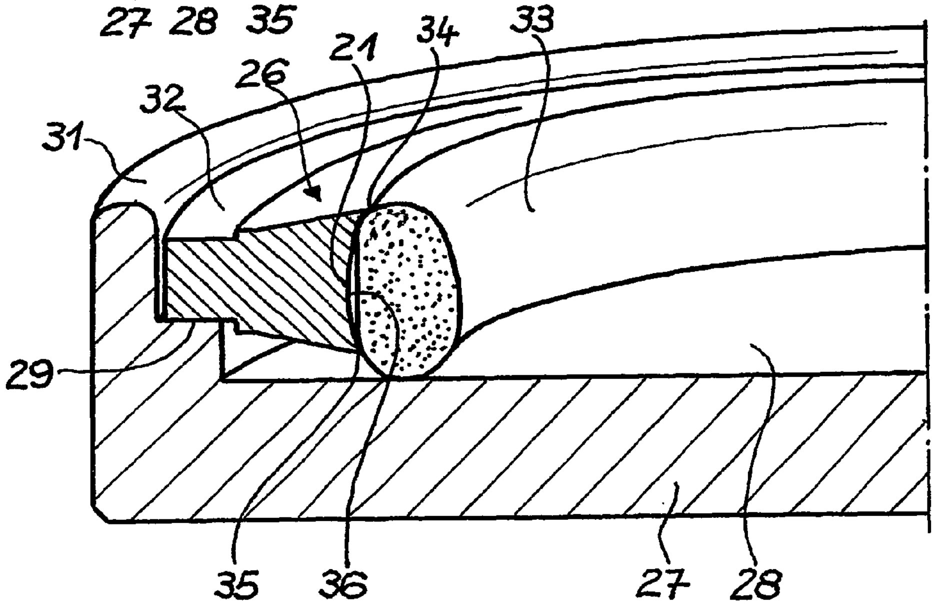
FIG. 3

PISTON FOR AN INTERNAL COMBUSTION ENGINE AND METHOD FOR ITS PRODUCTION

CROSS REFERENCE TO RELATED APPLICATIONS

This application is the National Stage of PCT/DE2006/002256 filed on Dec. 15, 2006, which claims priority under 35 U.S.C. §119 of German Application No. 10 2005 061 074.9 filed on Dec. 21, 2005. The international application under PCT article 21(2) was not published in English.

The present invention relates to a piston for an internal combustion engine, having a cast piston head, at least one ring insert cast into the piston head, and a circumferential cooling channel at the level of the ring insert, in the piston head, as well as to a method for its production.

In the case of internal combustion engines that are subject to great stress, in particular, such as, for example, diesel engines, the piston rings inserted into the uppermost ring groove are exposed to particularly great temperature stresses. Therefore, at least the uppermost ring groove is equipped with a ring insert as a reinforcement. The ring insert is generally produced from a friction-wear-resistant metal or from cast iron, preferably Niresist, an austenitic cast iron. Furthermore, a circumferential cooling channel is provided at the level of the ring insert, which channel is placed as close as possible to the ring groove, in order to guarantee good cooling of the ring groove and of the piston ring inserted in it. The cooling channel formed from a cooling channel component connected with the ring insert. For the production of the piston, the ring insert is laid into a casting mold, together with the cooling channel component connected with it, and the casting surrounds it when the piston or piston head is cast, and it is held in the piston head in this manner.

It is also known to produce the circumferential cooling channel, during the production of cast pistons, in that a salt core is laid into the casting mold. The salt core is removed after casting, in that the cooling channel is flushed with water through the inflow and outflow opening for the coolant.

In the state of the art, multiple methods are known for combining casting in a ring insert and producing a cooling channel by means of a salt core, in order to be able to do without a separate cooling channel component. JP 01 224 158 A discloses a method in which a fiber composite body with a salt core integrated into it is used. DE 197 01 085 A1 and DE 298 23 552 U1 show a method in which the ring insert is connected with the salt core by means of holding means. DE 103 25 916 A1 describes a method in which the ring insert has a recess open in a downward direction, on its back, in which recess a salt core is accommodated.

These known methods have in common that they are all complicated and difficult, either because of affixing the holding means between salt core and ring insert, or because of the production of a recess provided on the ring insert.

The task of the present invention consists in making available a piston that has at least one ring insert and a circumferential cooling channel at the level of the ring insert, and which is simple and cost-advantageous to produce.

The solution consists in a piston having the characteristics of claim 1 and of a method having the characteristics of claim 5. According to the invention, it is provided that the wall region of the cooling channel that is directed radially outward is formed by the ring insert, and the remaining wall regions of the cooling channel are formed by the piston head. The method according to the invention is characterized in that a ring-shaped salt core is brought to rest against the radial inner surface of a ring-shaped ring insert or ring insert blank, at least in part, the ring insert or ring insert blank and the salt core are heated together, in such a manner that the salt core and the ring insert or ring insert blank are connected with one another, the resulting component of ring insert or ring insert blank and salt core is placed in a casting mold, and the resulting component is surrounded by casting material in the casting mold.

The piston according to the invention is characterized by a simple structure. In particular, it is possible to do without holding elements between salt core and ring insert, i.e. a salt core completely surrounded by a ring insert. Since the cooling channel borders directly on the piston head over a large portion of its circumference, the dissipation of heat is improved, thereby making more effective cooling possible. In this way, the stress on the ring belt, particularly on the piston ring assigned to the cooling channel, is reduced, which leads to more reliable functioning of the piston according to the invention during its operation, and increases its useful lifetime. The production method according to the invention is significantly simplified as compared with the state of the art, and thus is particularly cost-advantageous and economical.

Advantageous further developments are evident from the dependent claims.

As a rule, the ring insert carries the uppermost ring groove, because the uppermost piston ring (compression ring) and with it the uppermost ring groove are subject to the greatest thermal and mechanical stresses. In individual cases, however, the ring insert can also form the ring groove adjacent to the uppermost ring groove.

The at least one ring insert is preferably produced from NiResist material, since this material has proven itself for this purpose. The term NiResist covers austenitic gray cast iron materials that are particularly characterized by corrosion resistance, and have thermal properties that are comparable to the piston head material, such as expansion coefficients, for example.

A ring insert blank can also be used for the method according to the invention, into which blank a ring groove is worked after the ring insert blank has had the casting material cast around it, in the course of piston production.

The salt core can be brought to rest against the upper and lower edge of the ring insert or ring insert blank, for example, in advantageous manner. In this manner, the ring insert or ring insert blank and the salt core can be connected with one another in the form of a clamp fit. In this way, a uniform component is obtained, in particularly simple manner, which can easily be introduced into the casting mold, if necessary after pre-treatment such as an Al-Fin method.

Depending on the material used for the ring insert or the ring insert blank, it and the salt core are heated to a temperature of 400 to 750° C., for example, preferably to 700° C.

In order to bring the salt core to rest against the ring insert or ring insert blank in the desired position in particularly simple manner, the ring insert or ring insert blank and the salt core can be disposed in a positioning device before being heated. The positioning device has support surfaces for the ring insert or ring insert blank and the salt core, which bring about correct positioning of the ring insert or ring insert blank and the salt core relative to one another.

Both a complete a piston and a piston head can be produced using the method according to the invention.

An exemplary embodiment of the invention will be described in greater detail below, using the attached drawings. These show, in a schematic representation, not to scale:

FIG. 1 a section through an exemplary embodiment of a piston according to the invention;

FIG. 2 a positioning device with a positioned ring insert and a positioned salt core, in half-section, before being heated;

FIG. 3 a positioning device according to FIG. 2 after having been heated.

FIG. 1 shows an exemplary embodiment of a piston 10 according to the invention. The piston 10 comprises a piston head 11 and a piston skirt 12 that follows it. The piston head 11 has a combustion bowl 13, as well as a ring belt 14 that runs around its circumference, with ring grooves for accommodating piston rings (not shown). In the region of the piston skirt 12, a bore 15 for accommodating a piston pin (not shown) is provided. In the exemplary embodiment, the piston 10 is cast from a metallic material, for example an aluminum material.

The uppermost ring groove 16, i.e. compression ring groove of the ring belt 14 is provided with a ring insert 17, for example made of a NiResist material. The piston head 11 furthermore has a circumferential cooling channel 18 at the level of the ring groove 16, i.e. of the ring insert 17. In this connection, only the wall region 19 of the cooling channel 18 that is directed radially outward, i.e. lies radially on the outside, is formed by the ring insert 17 itself, namely by the radial inner surface 21 of the ring insert 17. The remaining wall regions of the cooling channel 18, namely the wall region 22 that is directed radially inward, the wall region 23 that is directed axially upward, and the wall region 24 that is directed axially downward, are formed by the piston head 11 itself.

In the exemplary embodiment, inflow and outflow channels 25 for coolant are provided in the wall region 24 of the cooling channel 18 that is directed axially downward.

The first steps of the method according to the invention for production of the piston 10 are shown in FIGS. 2 and 3. First, a ring insert blank 26, which does not yet have a ring groove, is introduced into a positioning device 27. Of course, a finished ring insert 17 can also be used. The positioning device 27, which is approximately bowl-shaped in the exemplary embodiment, has a central support surface 28, and a ring-shaped, circumferential outer support surface 29 configured as a step, which is delimited by a circumferential edge 31. The positioning device 27 can consist of a material having poor heat conductivity, for example a ceramic material. In this case, subsequent heating (see below) takes place in a separate heating device, for example a heating oven. As an alternative to this, a heating device (not shown) can also be integrated into the positioning device, so that subsequent heating can take place directly by means of the positioning device, which should then consist of a heat-conductive material.

The ring insert blank 26 is introduced into the positioning device 27 in such a manner that it rests on the ring-shaped circumferential outer support surface 29 with its outer edge 32. In this connection, there is a distance between the circumferential edge 31 and the ring insert blank 26, on the one hand, and between the central support surface 28 and the ring insert blank 26, on the other hand, in each instance. The ring insert blank 26 is therefore positioned with a defined play both with regard to the circumferential edge 31 and with regard to the central support surface 28, on the other hand.

Now, a ring-shaped salt core 33 is introduced into the positioning device 27 in such a manner that it rests against the radial inner surface 21 of the ring insert blank 26, at least in part. In this connection, the salt core lies on the central support surface 28. The outer support surface 29, which is configured as a step, for support of the ring insert blank 26, is dimensioned, in terms of its height, in such a manner that the salt core 33 assumes a defined position on the ring insert blank 26, i.e. is brought to rest against the ring insert blank 26 in a defined position. In the exemplary embodiment, this defined position is configured in such a manner that the salt core 33 rests against the upper circumferential edge 34 and the lower circumferential edge 35 of the radial inner surface 21 of the ring insert blank 26, in each instance. In this connection, the radial inner surface 21 is concave, so that a defined gap 36 exists between it and the adjacent side surface of the salt core 33.

In a subsequent method step, the ring insert blank 26 and the salt core 33 are heated together. The temperature depends on the materials used, particularly for the ring insert blank 26, and is on the order of approximately 700° C. for ring insert blanks 26 made of NiResist materials, for example. It is essential that the salt core 33 expands with regard to the ring insert blank 26, because of its greater thermal expansion coefficient. For this process, the defined play with regard to the circumferential edge 31 and with regard to the central support surface 28, as well as the defined gap 36 with regard to the salt core 33, are provided, as explained above. In FIG. 3, it is clearly evident that the defined play, i.e. the gap 36 has been reduced as compared with the representation in FIG. 2.

Heating has the result that when the salt core 33 expands, the upper circumferential edge 34 and the lower circumferential edge 35 of the radial inner surface 21 press into the salt core 33. As a result, the salt core 33 and the ring insert blank 26 are connected with one another in a kind of shrink fit or clamp fit, to form a uniform component. This connection remains in existence after cooling.

The resulting component of ring insert and salt core can therefore be removed from the positioning device 27 without problems. The resulting component is pre-treated, if necessary, for example subjected to an Al-Fin method ("alfination"), and then placed into a casting mold, where is has an aluminum material cast around it, in the exemplary embodiment. As a result, a piston 10 having a ring insert blank 26 cast into it is obtained in the exemplary embodiment. The ring groove 16 is introduced into the ring insert blank 26, so that the finished ring insert 17 is obtained. The salt core 33 is removed in known manner, in that it is flushed out with water through the inflow and outflow channels 25.

The invention claimed is:

1. A method for the production of a piston for an internal combustion engine, having a cast piston head, at least one ring insert cast into the piston head, and a circumferential cooling channel at the level of the ring insert, in the piston head, having the following method steps:

a) resting a ring-shaped salt core against a radial inner surface of a ring-shaped ring insert or ring insert blank, at least in part;

b) disposing the ring insert or ring blank and said ring-shaped salt core in a positioning device and bringing said ring insert or ring blank and said ring-shaped salt core into contact;

c) heating together the ring insert or ring insert blank and said ring-shaped salt core so that said ring-shaped salt core and the ring insert or ring insert blank are connected with one another;

d) placing the resulting component of ring insert or ring insert blank and said ring-shaped salt core in a casting mold; and e) surrounding the resulting component by casting material in the casting mold.

2. The method according to claim 1, wherein the said ring-shaped salt core is brought to rest against the upper edge and lower edge of the ring insert or ring insert blank.

3. The method according to claim 1, wherein the ring insert or ring insert blank and said ring-shaped salt core are connected with one another in the form of a clamp fit.

4. The method according to claim 1, wherein the ring insert or ring insert blank and said ring-shaped salt core are heated to a temperature of 600 to 750 degree C.

5. The method according to claim 1, wherein the ring insert or ring insert blank is produced from Niresist material.

6. The method according to claim 5, wherein the resulting component is subjected to an Al-Fin method before being placed into the casting mold.

7. The method according to claim 1, wherein a ring insert blank is used, into which a ring groove is worked after the casting process.

8. The method according to claim 1, wherein a piston or a piston head is produced.

9. The method as in claim 1, further comprising the step of: removing said salt core to create a cooling channel having a wall region, wherein said cooling channel is formed by said ring insert or said ring blank and wherein any remaining wall regions of the cooling channel are formed by the piston head.

10. The method as in claim 1, further comprising the step of:

positioning said salt core inside of said ring insert.

11. The method as in claim 1, wherein the step of resting a ring-shaped salt core against the radial inner surface of a ring-shaped ring insert comprises providing at least one gap between said ring-shaped salt core and said radial inner surface.

* * * * *